US012032316B2

(12) United States Patent
Imaizumi

(10) Patent No.: US 12,032,316 B2
(45) Date of Patent: Jul. 9, 2024

(54) SHEET CONVEYANCE APPARATUS AND IMAGE FORMING APPARATUS

(71) Applicant: CANON KABUSHIKI KAISHA, Tokyo (JP)

(72) Inventor: Chikara Imaizumi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/751,792

(22) Filed: May 24, 2022

(65) Prior Publication Data

US 2022/0382201 A1 Dec. 1, 2022

(30) Foreign Application Priority Data

May 31, 2021 (JP) .................................. 2021-090899

(51) Int. Cl.
*G03G 15/00* (2006.01)
*H04N 1/00* (2006.01)

(52) U.S. Cl.
CPC ..... *G03G 15/5054* (2013.01); *G03G 15/6529* (2013.01); *H04N 1/00005* (2013.01); *H04N 1/00037* (2013.01); *H04N 1/00602* (2013.01); *H04N 1/00615* (2013.01); *H04N 1/00724* (2013.01); *H04N 1/00729* (2013.01)

(58) Field of Classification Search
CPC ........... G03G 15/6567; G03G 15/6529; G03G 15/235
See application file for complete search history.

(56) References Cited

U.S. PATENT DOCUMENTS

| 9,016,690 | B2 | 4/2015 | Fukunaga |
| 2012/0027442 | A1* | 2/2012 | Torimaru ........... G03G 15/5058 399/49 |
| 2015/0091998 | A1* | 4/2015 | Sano .................... B65H 3/0684 347/104 |
| 2017/0308016 | A1* | 10/2017 | Song ...................... G03G 15/00 |
| 2017/0315490 | A1* | 11/2017 | Nakamura ............. G03G 15/16 |

FOREIGN PATENT DOCUMENTS

| JP | H06156789 | A | 6/1994 |
| JP | 5409847 | B2 | 2/2014 |
| JP | 5617498 | B2 | 11/2014 |
| JP | 2015006950 | A | 1/2015 |

* cited by examiner

*Primary Examiner* — Jessica L Eley
(74) *Attorney, Agent, or Firm* — ROSSI, KIMMS & McDOWELL LLP

(57) ABSTRACT

A sheet conveyance apparatus includes a sheet conveyor configured to convey a sheet, a guide configured to form a conveyance path through which the sheet is conveyed by the sheet conveyor, and a sensor disposed on a same side as the guide with respect to the conveyance path. The guide includes a retracted portion disposed over a first region in a sheet width direction perpendicular to a sheet conveyance direction, the retracted portion being retracted with respect to a second region of the guide in the sheet width direction so as not to come into contact with the sheet passing through the conveyance path, the first region including a detection region of the sensor in the sheet width direction, the second region being a sheet passing region of the sheet in the sheet width direction excluding the first region.

21 Claims, 11 Drawing Sheets

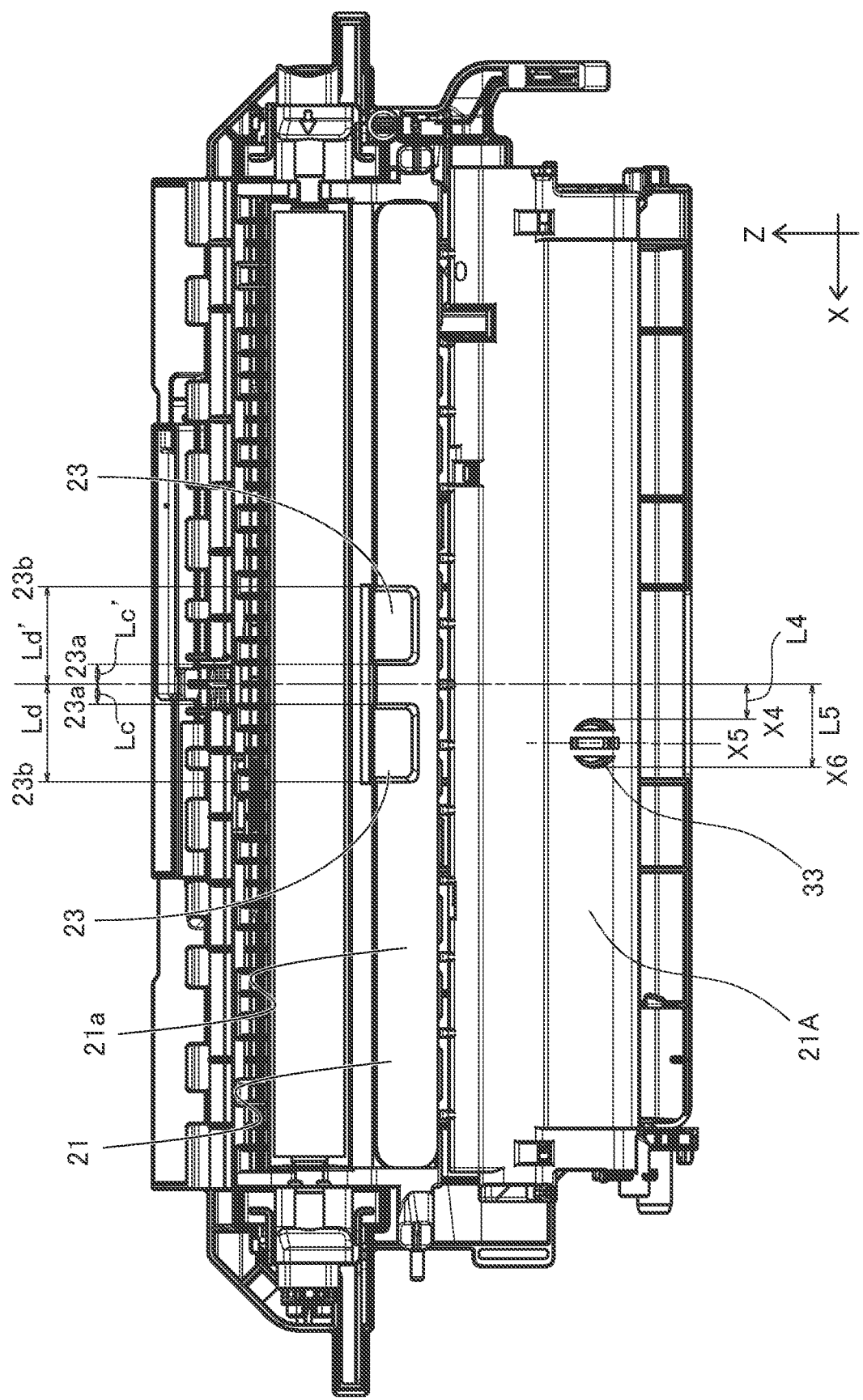

SHEET CONVEYANCE APPARATUS AND IMAGE FORMING APPARATUS

FIELD OF THE INVENTION

This disclosure relates to a sheet conveyance apparatus conveying a sheet and an image forming apparatus forming an image on the sheet.

DESCRIPTION OF THE RELATED ART

An image forming apparatus such as a printer, a copier, a multifunctional machine includes a sheet conveyance apparatus for conveying a sheet for use as a recording material. In such a sheet conveyance apparatus, since a fiber, filler, and the like of paper fall off from the sheet, a foreign substance in a form of fine particulates is sometimes generated. In Japanese Patent Application Laid-Open No. 2015-006950, the disposition of a cleaning member cleaning a surface of a registration roller so as to reduce the degradation of the conveyance performance due to the adhesion of the paper to the registration roller is described.

Incidentally, various sensors such as an optical sensor and an ultrasonic wave sensor are used in the sheet conveyance apparatus and the image forming apparatus so as to detect a density of an image which is formed (or has been formed) on the sheet or so as to automatically discriminate the material of the sheet used for image formation. However, if the paper dust generated inside of the apparatus adheres to the sensor, there is a possibility that the detection performance of the sensor is degraded.

SUMMARY OF THE INVENTION

The present invention provides a sheet conveyance apparatus and an image forming apparatus that can reduce degradation in detection performance of a sensor caused by paper dust generated from sheet.

According to one aspect of the invention, a sheet conveyance apparatus includes a sheet conveyor configured to convey a sheet, a guide configured to form a conveyance path through which the sheet is conveyed by the sheet conveyor, and a sensor disposed on a same side as the guide with respect to the conveyance path, wherein the guide includes a retracted portion disposed over a first region in a sheet width direction perpendicular to a sheet conveyance direction, the retracted portion being retracted with respect to a second region of the guide in the sheet width direction so as not to come into contact with the sheet passing through the conveyance path, the first region including a detection region of the sensor in the sheet width direction, the second region being a sheet passing region of the sheet in the sheet width direction excluding the first region.

According to another aspect of the invention, an image forming apparatus includes a toner image forming unit including an image bearing member and configured to form a toner image on the image bearing member, an intermediate transfer member configured to convey the toner image transferred from the image bearing member, a transfer member configured to form a secondary transfer portion with the intermediate transfer member and transfer the toner image from the intermediate transfer member onto a sheet, a sheet conveyor configured to convey the sheet, a first guide disposed on a same side as the intermediate transfer member with respect to a conveyance path of the sheet and configured to guide the sheet to the secondary transfer portion, a second guide disposed on an opposite side of the intermediate transfer member with respect to the conveyance path and configured to face the first guide, and an optical sensor disposed downstream of a primary transfer portion and upstream of the secondary transfer portion in a conveyance direction of the intermediate transfer member and configured to detect a pattern image formed on the intermediate transfer member by the toner image forming unit, the primary transfer portion being a portion at which the toner image is transferred from the image bearing member to the intermediate transfer member, wherein, when viewed in a sheet width direction perpendicular to a sheet conveyance direction, the guide is projected to the conveyance path such that a more downstream part thereof in the sheet conveyance direction is closer to the second guide, and wherein a downstream end of the guide in the sheet conveyance direction includes a retracted portion disposed over a first region in the sheet width direction, the retracted portion being retracted toward an upstream side in the sheet conveyance direction with respect to a part of the downstream end in a second region in the sheet width direction, the first region including a detection region of the sensor in the sheet width direction, the second region being a sheet passing region of the sheet in the sheet width direction excluding the first region.

Further features of the present invention will become apparent from the following description of exemplary embodiments with reference to the attached drawings.

BRIEF DESCRIPTION OF THE DRAWINGS

FIG. 11 is a diagram showing a positional relationship of a drawn portion of the second pretransfer guide and a sheet material discrimination sensor according to the embodiment 2.

DESCRIPTION OF THE EMBODIMENTS

Hereinafter, with reference to drawings, embodiments according to this disclosure will be described.

Embodiment 1

Figure 1:
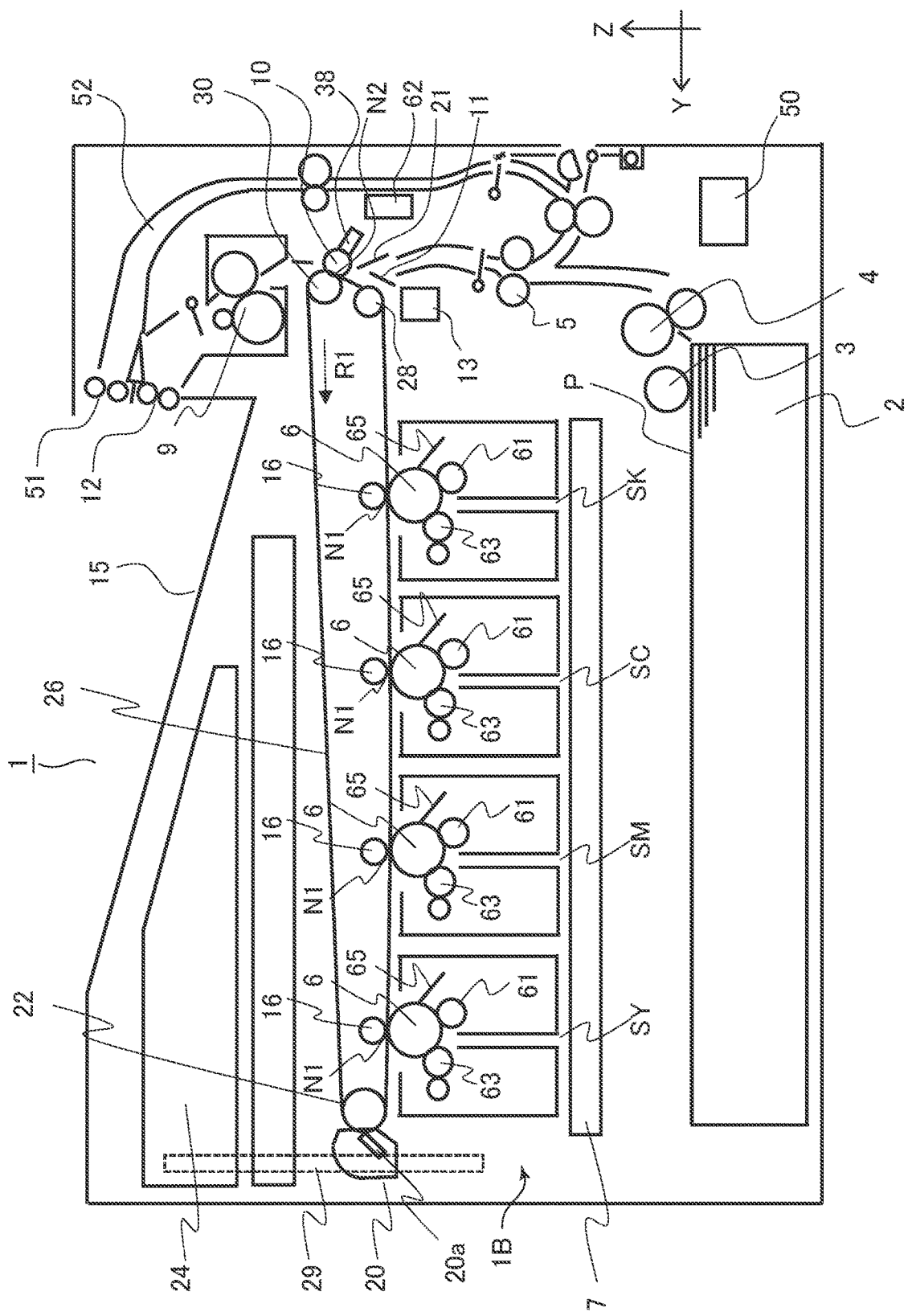
FIG. 1 is a schematic diagram showing an image forming apparatus according to an embodiment 1.

FIG. 1 is a schematic diagram showing a cross-sectional configuration of an image forming apparatus 1 according to a first embodiment (embodiment 1). The image forming apparatus 1 of this embodiment is an intermediate transfer type color printer using an electrophotographic system, and forms an image on a sheet P, serving as a recording material, based on image information input from an external apparatus. As the recording material, it is possible to use various kinds of sheet materials different in size and material including paper such as standard paper and cardboard, a plastic film, cloth, a surface treated sheet such as coated paper, and a sheet material of a special shape such as an envelope and an index sheet.

The image forming apparatus 1 includes an image forming unit 1B including a first, second, third, and fourth process units SY, SM, SC, and SK, serving as a plurality of toner image forming units. The first to fourth process units SY to SK respectively form the images of respective colors of yellow (Y), magenta (M), cyan (C), and black (K). These four process units SY, SM, SC, and SK are disposed at regular intervals in a row, and, further, in this embodiment, are disposed under an intermediate transfer belt 26 with respect to the gravity direction.

In this example, configurations of the first to fourth process units SY to SK are substantially the same except for differences in the colors of toners used therein. Drum type photosensitive members, serving as a rotatable image bearing member (hereinafter, referred to as a photosensitive drum 6) bearing a toner image, are disposed in the respective process units SY, SM, SC, and SK. A charge roller 61, serving as a charge member charging the photosensitive drum 6, a developing device, serving as a developing unit, and a cleaning unit are disposed around the photosensitive drum 6. Further, with respect to a rotational direction of the photosensitive drum 6, an exposing portion, serving as an exposing portion at which the photosensitive drum 6 is irradiated with a laser beam from a laser scanner 7, serving as an exposing unit, is disposed downstream of the charge roller 61 and upstream of a developing portion at which development is performed by the developing device.

The developing device includes a developing roller 63, serving as a developing member (developer bearing member), and a container storing the developer containing the toner. The developing roller 63 is rotatable by receiving driving force from a driving source, not shown. The cleaning unit includes a cleaning blade 65, serving as a cleaning member, coming into contact with the photosensitive drum 6, and stores the toner collected by the cleaning blade 65.

As shown in FIG. 1, the intermediate transfer belt 26, which is an endless shaped belt member serving as an intermediate transfer member, is disposed so as to face the photosensitive drums 6 of the respective process units SY to SK. The intermediate transfer belt 26 is stretched over a plurality of roller members, serving as a stretching member. In particular, the intermediate transfer belt 26 is stretched in such a manner that an inner circumferential surface of the intermediate transfer belt 26 is supported by three stretching rollers of a drive roller 30, a driven roller 28, and a tension roller 22. Further, the intermediate transfer belt 26 is conveyed (rotationally moved) in an arrow R1 direction in FIG. 1 by the drive roller 30 rotated by receiving driving force from a driving source, not shown.

Four primary transfer rollers 16, serving as a primary transfer member, are disposed in positions on a side of the inner circumferential surface of the intermediate transfer belt 26 and facing the photosensitive drums 6. The primary transfer roller 16 is urged to the photosensitive drum 6 across the intermediate transfer belt 26 at predetermined pressure, and forms a primary transfer portion N1 as a nip portion at which the intermediate transfer belt 26 and the photosensitive drum 6 come into contact with each other. Further, a primary transfer power source, not shown, is coupled to the primary transfer roller 16, and is able to apply the voltage of a predetermined polarity to the primary transfer roller 16.

On a side of an outer circumferential surface of the intermediate transfer belt 26, a secondary transfer roller 10, serving as a transfer member (secondary transfer member), is disposed in a position facing the drive roller 30. The secondary transfer roller 10 is urged to the drive roller 30 across the intermediate transfer belt 26 at predetermined pressure by a transfer spring 38, serving as an urging member, and forms a secondary transfer portion N2 as a nip portion at which the secondary transfer roller 10 and the intermediate transfer belt 26 come into contact with each other. A secondary transfer power source, not shown, is coupled to the secondary transfer roller 10, and is able to apply the voltage of a predetermined polarity to the secondary transfer roller 10.

With respect to a moving direction of the intermediate transfer belt 26, a cleaning unit 20 is disposed upstream of the primary transfer portion N1 and downstream of the secondary transfer portion N2, and collects the toner remained on the intermediate transfer belt 26 after secondary transfer (hereinafter referred to as a residual toner). The cleaning unit 20 includes a cleaning blade 20a coming into contact with the intermediate transfer belt 26.

A sheet feeding unit including a cassette 2 for storing the sheet P, a feed roller 3 for feeding the sheet P, and a separation roller pair 4 for conveying the sheet P to the secondary transfer portion N2 is disposed in a lower part of the image forming apparatus 1. The separation roller pair 4 includes a conveyance roller for conveying the sheet P received from the feed roller 3, and a separation roller for forming a separation nip by being brought into pressure contact with the conveyance roller and separating the sheet P by friction force. With respect to a conveyance direction of the sheet P, a registration roller pair 5 is disposed downstream of the separation roller pair 4 and upstream of the secondary transfer portion N2.

With respect to the conveyance direction of the sheet P, a heat fixing type fixing device 9, a sheet discharge roller pair 12 for discharging the sheet P from the image forming apparatus 1, and a sheet stacking tray 15 on which the discharged sheets P are stacked are disposed downstream of the secondary transfer portion N2. The fixing device 9 includes a roller pair for nipping and conveying the sheet P, and a heating unit such as a halogen lamp for heating the image on the sheet P.

Further, a reverse conveyance roller pair 51 for inverting first and second surfaces of the sheet P is disposed above the sheet discharge roller pair 12, and a switch guide 49 switching the conveyance direction of the sheet P between the sheet discharge roller pair 12 and the reverse conveyance roller pair 51 is disposed downstream of the fixing device 9. Further, a duplex conveyance path 52 extending from the reverse conveyance roller pair 51 toward the registration roller pair 5 is disposed in the image forming apparatus 1, and a plurality of conveyance roller pairs are disposed in the duplex conveyance path 52. The rollers (roller pairs) described above, including the registration roller pair 5, disposed along the conveyance path in the image forming apparatus 1 are examples of a sheet conveyor conveying the sheet P.

Image Forming Operation

When the image information and an execution command of an image forming operation are transmitted from the external apparatus, not shown, to a controller 50 of the image forming apparatus 1, the controller 50 starts the image forming operation described below by controlling the respective units in the image forming apparatus 1. First, the photosensitive drums 6 and the developing rollers 63 of the respective process units SY to SK and the drive roller 30 driving the intermediate transfer belt 26 are driven at a predetermined rotational speed. A surface of the rotating photosensitive drum 6 is approximately uniformly charged in a predetermined polarity (in this embodiment, negative polarity) by the charge roller 61. In this process, a predetermined charge voltage is applied to the charge roller 61 from a charge power source. Thereafter, the laser beam modulated based on the image information corresponding to the process units SY to SK (signal corresponding to respective color components of the image information) is radiated from the laser scanner 7, so that the photosensitive drum 6 is exposed. Thereby, an electrostatic latent image in accordance with the image information is formed on the surface of the photosensitive drum 6.

The developing roller 63 bears the toner charged in a normal charge polarity of the toner (in this embodiment, negative polarity), and a predetermined developing voltage is applied from a developing power source. Thereby, the latent image formed on the photosensitive drum 6 is visualized at a facing portion (developing portion) of the photosensitive drum 6 and the developing roller 63 by the toner of the negative polarity, and the toner image is formed on the photosensitive drum 6.

Next, the toner image formed on the photosensitive drum 6 is transferred (primary transfer) onto the intermediate transfer belt 26, which is being rotatably driven, at the primary transfer portion N1 by an electrical current (hereinafter, referred to as a primary transfer electrical current) flowing from the primary transfer rollers 16 to the photosensitive drum 6. In this process, the voltage of a reverse polarity (in this embodiment, positive polarity) opposite to the normal charge polarity of the toner is applied to the primary transfer roller 16 from the primary transfer power source. In this embodiment, the toner image is primarily transferred from the photosensitive drum 6 to the intermediate transfer belt 26 by the constant current control controlling the output of the primary transfer power source such that a predetermined primary transfer electrical current flows from the primary transfer roller 16 toward the photosensitive drum 6.

When forming a full color image, the electrostatic latent images are formed on the photosensitive drums 6 of the respective process units SY to SK, and are developed, so that the toner images of the respective colors are formed. Then, the toner images of the respective colors formed on the photosensitive drums 6 of the respective process units SY to SK are transferred in a manner being superimposed in sequence on the intermediate transfer belt 26 at the respective primary transfer portions N1, so that the full color image including the toners of four colors is formed on the intermediate transfer belt 26.

On the other hand, the sheet P stored in the cassette 2, serving as a storing unit, is sent out from the cassette 2 by the feed roller 3, and conveyed in a state separated into one sheet at a time by the separation roller pair 4. A leading edge of the sheet P is abutted onto the registration roller pair 5 which is in a stop state, and skew is corrected. Thereafter, registration roller pair 5 conveys the sheet P to the secondary transfer portion N2 in the timing synchronizing with an image forming process in the image forming unit 1B. Then, the toner image borne on the intermediate transfer belt 26 is transferred (secondary transfer) onto the conveyed sheet P at the secondary transfer portion N2 by an electrical current (hereinafter referred to as a secondary transfer electrical current) flowing from the secondary transfer roller 10 to the intermediate transfer belt 26. In this process, the voltage of the reverse polarity (in this embodiment, positive polarity) opposite to the normal charge polarity of the toner is applied to the secondary transfer roller 10 from the secondary transfer power source. In this embodiment, the toner image is secondarily transferred from the intermediate transfer belt 26 onto the sheet P by the constant current control controlling the output of the secondary transfer power source such that a predetermined secondary transfer electrical current flows from the secondary transfer roller 10 toward the intermediate transfer belt 26.

Thereafter, the sheet P onto which the toner image has been transferred is conveyed to the fixing device 9, and, after the toner image has been fixed on a surface of the sheet P, is discharged outside of an apparatus body of the image forming apparatus 1 by the sheet discharge roller pair 12, and stacked on the sheet stacking tray 15. In a case performing duplex printing, the sheet P onto whose first surface the toner image has been transferred and which has passed through the fixing device 9 is guided to the reverse conveyance roller pair 51, and conveyed to the duplex conveyance path 52 by being switchbacked and conveyed by the reverse conveyance roller pair 51. Then, the sheet P onto whose second surface opposite to the first surface the toner image has been formed by having passed through the secondary transfer portion N2 and the fixing device 9 again is discharged outside of the apparatus body of the image forming apparatus 1 by the sheet discharge roller pair 12, and is stacked on the sheet stacking tray 15.

To be noted, the toner remained on the photosensitive drum 6 after the primary transfer is removed from the surface of the photosensitive drum 6 by the cleaning blade 65. Further, the toner remained on the intermediate transfer belt 26 after having passed through the secondary transfer portion N2 is removed from the surface of the intermediate transfer belt 26 by the cleaning blade 20a. Thereafter, the removed toner passes a toner conveyance path 29, and is stored in a toner collection container 24.

Calibration Operation

As described above, in the image forming operation, after the toner images have been formed on the respective process units SY to SK, the toner images are transferred onto the intermediate transfer belt 26 in the manner superimposing the toner images on each other. However, there is a possibility of the occurrence of the misalignment of the toner images of the respective colors transferred onto the intermediate transfer belt 26 and the deviation of densities of the toner images formed by the process units SY to SK from a set value or acceptable limits. Examples of factors causing such deviation include component tolerances of the image forming apparatus 1, a change in a resistance value of the intermediate transfer belt 26 due to changes in an installation environment, and the wear of the photosensitive drum 6.

As shown in FIG. 1, the image forming apparatus 1 includes a patch sensor 13 that is a sensor for automatically correcting (calibration) the deviation of a position and the density of the toner image described above. The controller 50 of the image forming apparatus 1 lets the process units SY to SK form a pattern image for measurement so as to perform an adjustment of the image, and lets the patch sensor 13 read the pattern image transferred onto the intermediate transfer belt 26. Then, based on a reading result of the patch sensor 13, the controller 50 adjusts the position and the density (gradation) of the image which the process units SY to SK form. In such an adjustment control, the data obtained as the reading result of the pattern image by the patch sensor 13 are sent to the controller 50 and computed, and, based on such a result, the timing, an exposure time, and the like of the exposure of the photosensitive drum 6 by the laser scanner 7 are adjusted.

The patch sensor 13 includes a light emitting portion (light emitting element) such as a light-emitting diode (LED) and a light receiving portion (light receiving element) such as a phototransistor, and is an optical sensor detecting an amount of light of reflected light emitted from the light emitting portion and reflected by the toner image on the intermediate transfer belt 26. The pattern image in which the toner images of the respective colors including line segments in a main scanning direction (X direction) are disposed in a sub-scanning direction is an example of the pattern image for the measurement. In this case, it is possible to correct a color shift of the color image by adjusting the exposure start timing of the laser scanner 7 on the respective process units SY to SK based on a difference obtained by comparing a space between the toner images detected by the patch sensor 13 with a predetermined space. The pattern image is not limited to this, and, for example, a patch image for the adjustment of the density of the image is acceptable.

Configuration Adjacent to Secondary Transfer Portion

Next, using FIGS. 2 to 7, configurations in and around the secondary transfer portion N2, and a sheet conveyance path inside of the image forming apparatus will be described. To be noted, in drawings, an upward direction in the vertical direction for a case where the image forming apparatus 1 is installed on a horizontal plane is referred to as a Z direction (indicated by an arrow Z). A direction parallel to a rotational axis direction of the photosensitive drum 6 is referred to as an X direction (indicated by an arrow X). The X direction is a sheet width direction perpendicular to a sheet conveyance direction inside of the image forming apparatus 1, and also the main scanning direction at the image formation. The X direction is a direction intersecting, preferably orthogonally intersecting, with the Z direction. Further, the horizontal direction orthogonally intersecting with the Z and X directions is referred to as a Y direction (indicated by an arrow Y).

Figure 2:
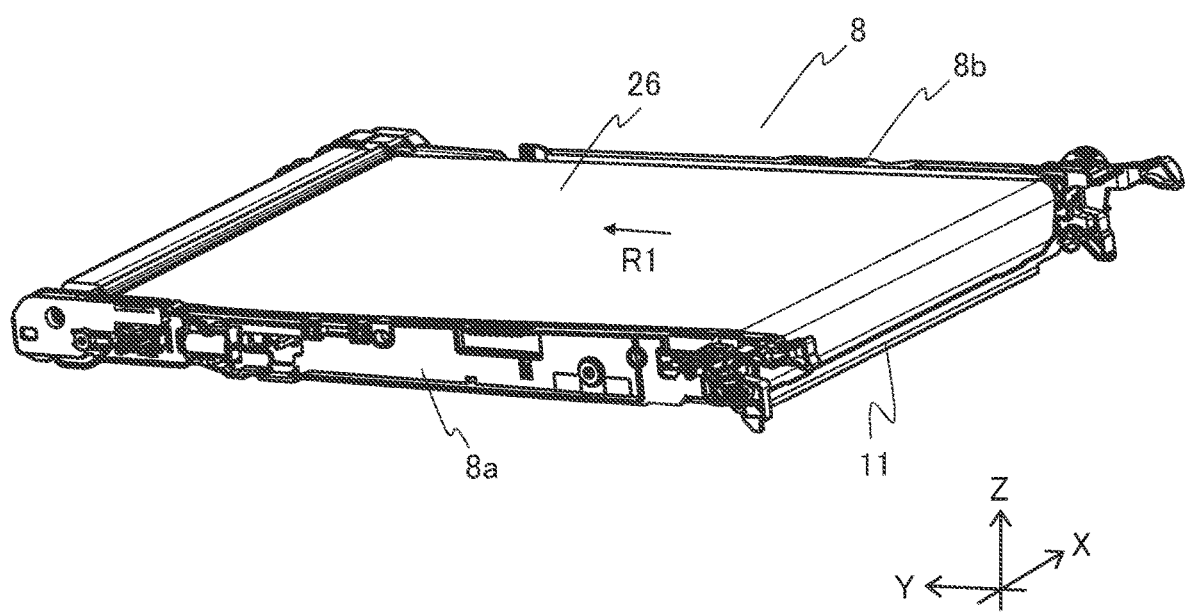
FIG. 2 is a perspective view showing an intermediate transfer unit according to the embodiment 1.
Figure 3:
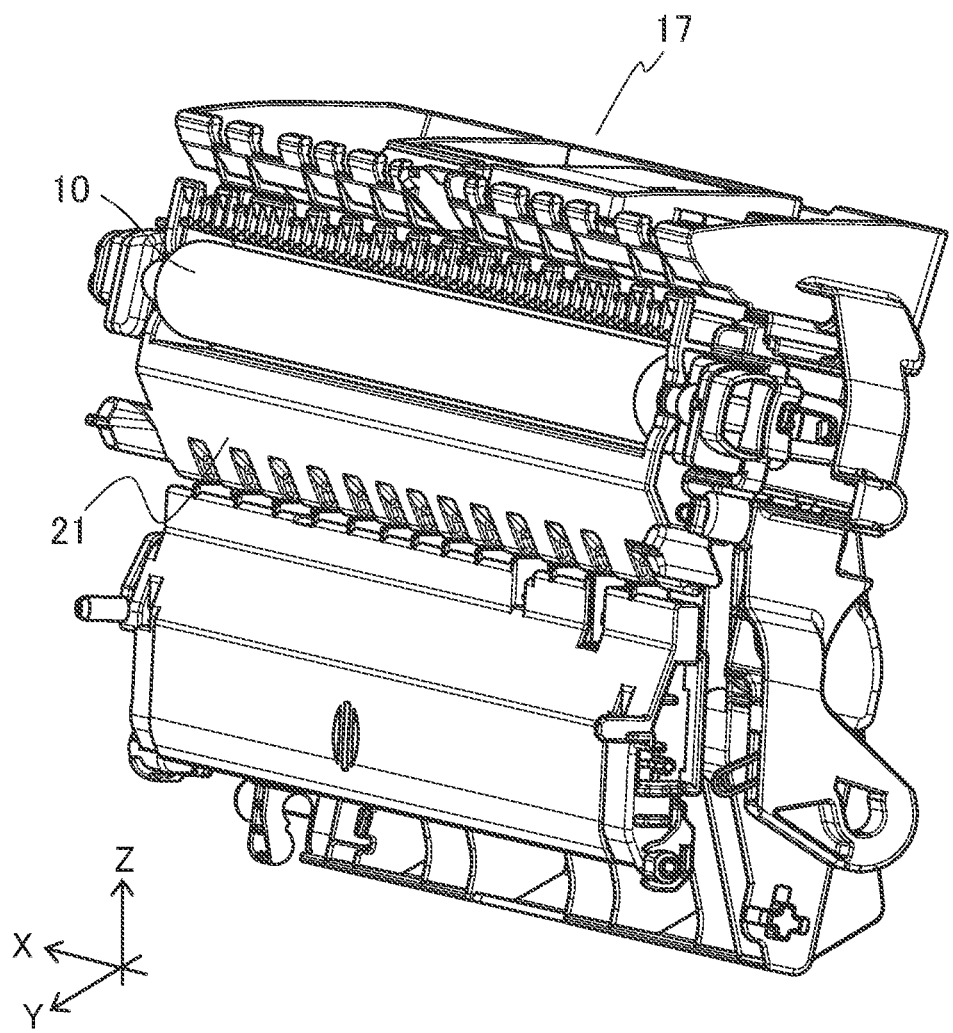
FIG. 3 is a perspective view showing a secondary transfer unit according to the embodiment 1.
Figure 4:
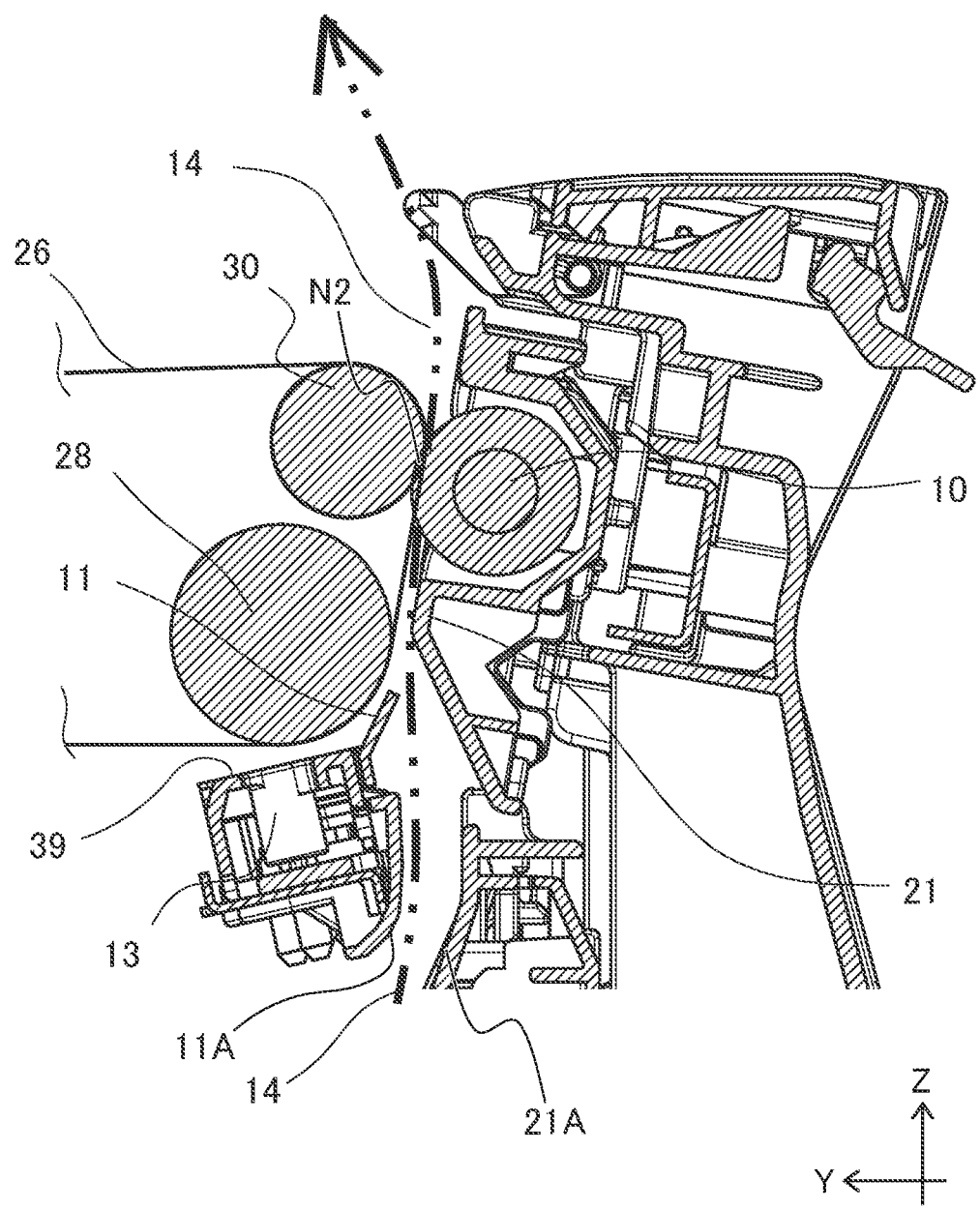
FIG. 4 is a cross-sectional view showing a configuration adjacent to a secondary transfer portion of the image forming apparatus according to the embodiment 1.

FIG. 2 is a perspective view showing an intermediate transfer unit 8. FIG. 3 is a perspective view showing a secondary transfer unit 17. FIG. 4 is a cross-sectional view around the secondary transfer portion N2 cut at a plane perpendicular to the X direction.

As shown in FIG. 2, in addition to the intermediate transfer belt 26, the drive roller 30, the driven roller 28, and the tension roller 22, the intermediate transfer unit 8 includes side frames 8a and 8b and a first pretransfer guide 11. The side frames 8a and 8b are members disposed on both sides of the intermediate transfer unit 8 in the X direction and extending approximately in the Y direction in a narrow-elongated shape. Both ends of the drive roller 30, the driven roller 28, and the tension roller 22 in the axial direction (X direction) are rotatably held by the side frames 8a and 8b. The side frames 8a and 8b are coupled to each other by a frame member, not shown, extending in the X direction, so as to construct a frame body of the intermediate transfer unit 8.

Both ends of the first pretransfer guide 11 in the X direction are supported by the side frames 8a and 8b. The first pretransfer guide 11 is a guide member facing a second pretransfer guide 21 (refer to FIG. 3) of the secondary transfer unit 17, described later. The first pretransfer guide 11 forms part of a sheet conveyance path (conveyance space) between the registration roller pair 5 and the secondary transfer portion N2 with the second pretransfer guide 21 (refer to FIG. 4). The first pretransfer guide 11 is a guide facing a side of a sheet surface (image surface, first surface), onto which the toner image is transferred at the secondary transfer portion N2, among surfaces of the sheet P conveyed toward the secondary transfer portion N2.

As shown in FIG. 2, the first pretransfer guide 11 is supported by the side frames 8a and 8b of the intermediate transfer unit 8. The first pretransfer guide 11 is a plate shaped member extending in the X direction, which is the sheet width direction, in the narrow-elongated shape. The first pretransfer guide 11 extends in the X direction over a region including the whole of a sheet passing region. The sheet passing region indicates a region through which the sheet P passes in a case where the image forming apparatus 1 conveys the sheet P with a maximum sheet width (length in the X direction) on which the image forming apparatus 1 is able to perform the image formation. Further, as shown in FIG. 4, a downstream end of the first pretransfer guide 11 in the sheet conveyance direction (approximately upward in FIG. 4) is positioned between a portion supported by the driven roller 28 inside of the intermediate transfer belt 26 and a sheet conveyance path 14. The sheet conveyance path 14 indicates a representative passing path of the sheet P (design passing position of the sheet P) conveyed inside of the image forming apparatus 1. Further, the sheet conveyance direction indicates a moving direction of the sheet P conveyed along the sheet conveyance path 14.

Next, the secondary transfer unit 17 will be described. As shown in FIG. 3, the secondary transfer unit 17 includes the secondary transfer roller 10 and the second pretransfer guide 21. Both ends of the secondary transfer roller 10 in the axial direction (X direction) are rotatably held by a frame body of the secondary transfer unit 17. The second pretransfer guide 21 is a guide, namely an opposite guide facing a sheet surface (non-image surface, second surface), among the surfaces of the sheet P conveyed toward the secondary transfer portion N2, opposite to the sheet surface (image surface, first surface) onto which the toner image is transferred at the secondary transfer portion N2. The second pretransfer guide 21 is a plate shaped member extending in the X direction that is the sheet width direction. With respect to the X direction, the second pretransfer guide 21 extends over the region including the whole of the sheet passing region.

FIG. 4 shows a positional relationship between the sheet conveyance path 14 and peripheral members adjacent to the secondary transfer portion N2. On an upstream side of the secondary transfer portion N2, the sheet is guided such that a posture of the sheet P is determined by the edge (downstream edge in the sheet conveyance direction) of the first pretransfer guide 11 of the intermediate transfer unit 8 and the second pretransfer guide 21 disposed in the secondary transfer unit 17. With this configuration, it is possible to stabilize the conveyance of the sheet P by guiding the sheet P adjacent to the secondary transfer portion N2, so that it is possible to prevent image defects caused by an unstable posture of the sheet P before transfer. The first pretransfer guide 11 contributes to the prevention of the image defects by regulating an accidental contact of the sheet P with the intermediate transfer belt 26 on the upstream side of the secondary transfer portion N2.

In this example, guide surfaces of the first and second pretransfer guides 11 and 21 facing each other incline such that the guide surfaces approach nearer to each other toward a downstream side in the sheet conveyance direction. That is, in a case viewed in the sheet width direction, the first pretransfer guide 11, serving as the guide in this example, inclines more to an opposite side of the conveyance path toward the downstream side in the sheet conveyance direction. The second pretransfer guide 21 has a similar inclination. Further, the guide surface of the first pretransfer guide 11 inclines so as to project more toward the opposite side of the conveyance path with respect to an extension line of an upstream guide 11A, which guides the sheet P on an upstream side of the first pretransfer guide 11, toward the downstream side in the sheet conveyance direction (that is, a more downstream part of the first pretransfer guide 11 is closer to the second pretransfer guide 21, serving as the opposite guide). Similarly, the guide surface of the second pretransfer guide 21 inclines so as to project more toward the opposite side of the conveyance path with respect to an extension line of an upstream guide 21A, which guides the sheet P on an upstream side of the second pretransfer guide 21, toward the downstream side in the sheet conveyance direction.

Disposition of Sensor

The disposition of the patch sensor 13 measuring the pattern image on the intermediate transfer belt 26 will be described. Since the intermediate transfer belt 26 which is a belt member having elasticity is a measuring object, so as to make a distance between an outer circumferential surface of the intermediate transfer belt 26 and the patch sensor 13 become constant, it is preferred to dispose the patch sensor 13 in a portion where a traveling position of the intermediate transfer belt 26 is stabilized. Therefore, the patch sensor 13 is suitably disposed in a position where the inner circumferential surface of the intermediate transfer belt 26 is supported by the roller members (positions facing the roller members across the intermediate transfer belt 26).

Figure 5:
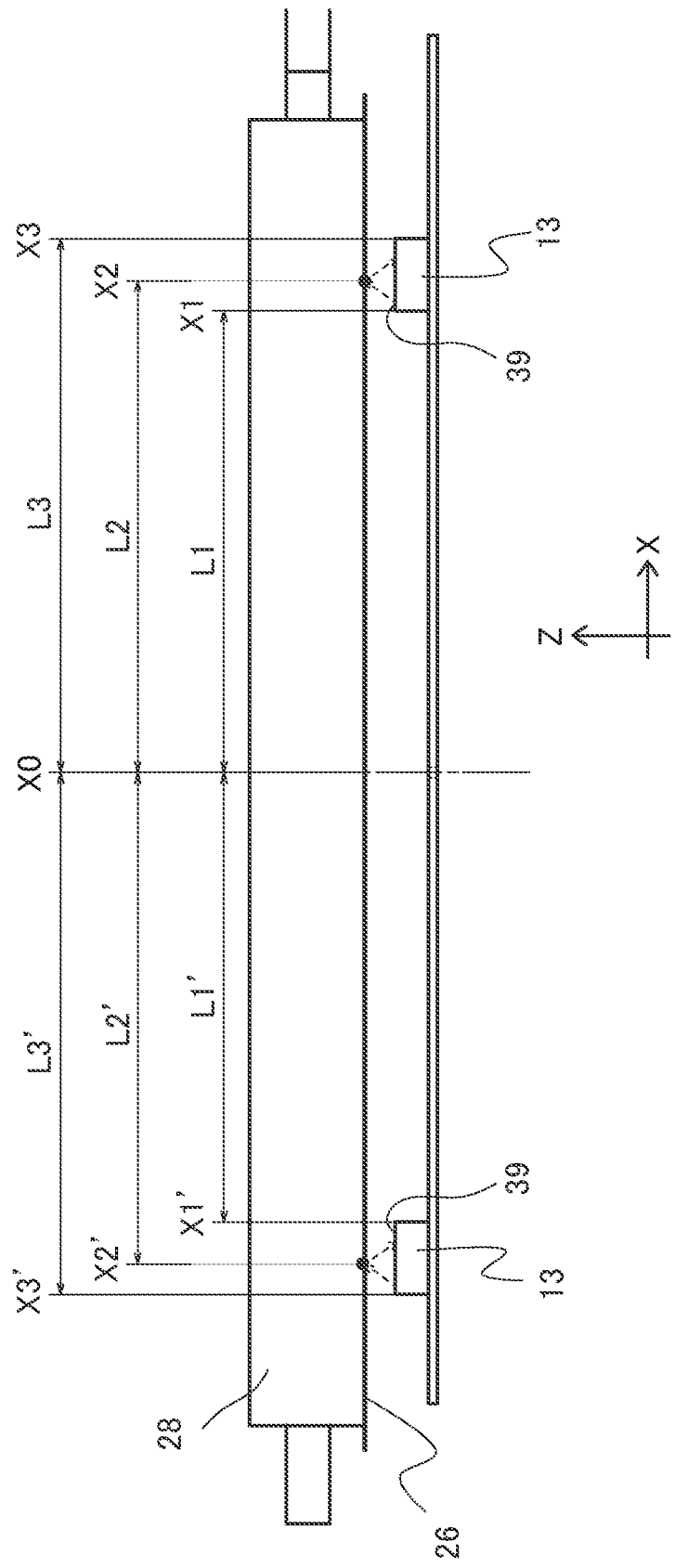
FIG. 5 is a schematic diagram showing the disposition of a patch sensor according to the embodiment 1.

As shown in FIG. 5, the patch sensors 13 of this embodiment are disposed in positions facing the driven roller 28 across the intermediate transfer belt 26. The driven roller 28 is a second roller disposed upstream of the drive roller 30, serving as a first roller disposed at the secondary transfer portion N2, in the sheet conveyance direction. To be noted, as shown in FIG. 1, in the conveyance direction of the intermediate transfer belt 26, the driven roller 28 is also a roller positioned downstream of the primary transfer portions N1 of the process units SY to SK and upstream of the drive roller 30. In this embodiment, since the layout in which the process units SY to SK are disposed downstream of the intermediate transfer belt 26 stretched approximately in the Y direction is applied, an upper surface 39 of the patch sensor 13 faces the intermediate transfer belt 26. Further, as shown in FIG. 5, in a state viewed in the X direction, the patch sensor 13 is adjacent to a surface opposite to a surface on a side of the sheet conveyance path 14 of the first pretransfer guide 11. That is, in a case viewed in the sheet width direction, the optical sensor of this embodiment is disposed on an opposite side of the conveyance path across the guide and in a position facing the second roller across the belt member.

FIG. 5 is a cross-sectional view showing the disposition of the patch sensors 13 and the intermediate transfer belt 26, and schematically indicates a cross-section of the apparatus cut at a plane passing through the rotational axis of the driven roller 28 and an optical axis of the patch sensors 13. As shown in FIG. 5, the patch sensors 13 of this embodiment are disposed adjacent to both ends of the intermediate transfer belt 26 in the X direction one at each end.

Hereinafter, the central position of the intermediate transfer belt 26 in the X direction is referred to as a central reference position X0. The central reference position X0 is also a reference of the central position of the sheet P conveyed through the sheet conveyance path 14 in the sheet width direction. That is, the image forming apparatus 1 conveys the sheet P while aligning the center of the sheet P in the sheet width direction with the central reference position X0.

As regards one side (right side in FIG. 5) of the patch sensors 13 in the X direction, with respect to the X direction, within a surface of the patch sensor 13, which faces the intermediate transfer belt 26, an end position on a side near to the central reference position X0 is referred to as X1, and an end position on a side far from the central reference position X0 is referred to as X3. A detection position (reflected position of a representative optical path from the light emitting portion toward the light receiving portion) where the one side of the patch sensors 13 in the X direction detects the image on the intermediate transfer belt 26 is referred to as X2. The detection position X2 is a position between the end positions X1 and X3. Distances from the central reference position X0 to the respective positions (X1, X2, and X3) of the one side of the patch sensor 13 are respectively referred to as L1 (millimeter (mm)), L2 (mm), and L3 (mm).

Similarly, as regards the other side (left side in FIG. 5) of the patch sensors 13 in the X direction, with respect to the X direction, within a surface of the patch sensor 13, which faces the intermediate transfer belt 26, an end position on a side near to the central reference position X0 is referred to as X1', and an end position on a side far from the central reference position X0 is referred to as X3'. A detection position where the other side of the patch sensors 13 in the X direction detects the image on the intermediate transfer belt 26 is referred to as X2'. The detection position X2' is a position between the end positions X1' and X3'. Distances from the central reference position X0 to the respective positions (X1', X2', and X3') of the other side of the patch sensors 13 are respectively referred to as L1' (mm), L2' (mm), and L3' (mm).

Two patch sensors 13 are suitably disposed such that at least the detection positions X2 and X2' are positioned symmetrically to each other with respect to the central reference position X0 in the X direction. That is, except for the unavoidable misalignment such as component tolerances, L2 equals to L2'.

Detail of Pretransfer Guide

Next, the first pretransfer guide 11 will be described in detail. It is possible to form the first pretransfer guide 11 by a resin material and a metal material, and a metal plate is suitable in view of stiffness and wear resistance. The first pretransfer guide 11 is the last guide positioned before the secondary transfer portion N2, and, since the first pretransfer guide 11 rubs the sheet P each time when the image formation is performed, by using the metal plate having high wear resistance, it is possible to reduce the wear of the guide and cope with the life elongation of the image forming apparatus 1. Further, since the disturbance of the image is led when the sheet P comes into contact with the intermediate transfer belt 26 before entering into the secondary transfer portion N2, so as to regulate such contact more reliably, it is particularly preferred to form the first pretransfer guide 11 by the material having the high stiffness. A preferred material for the first pretransfer guide 11 is, for example, a rolled steel sheet.

Figure 6:
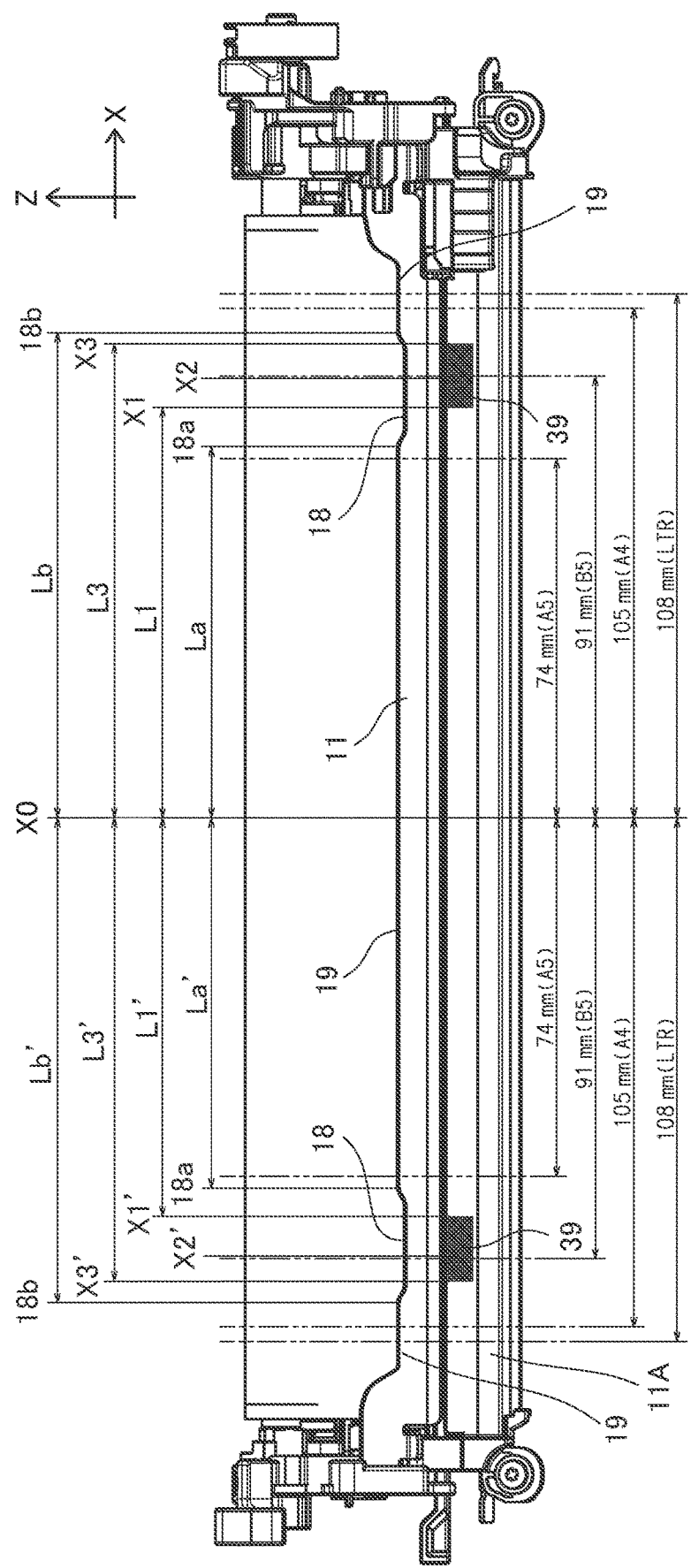
FIG. 6 is a diagram showing a positional relationship of a notch portion of a first pretransfer guide and the patch sensor according to the embodiment 1.

Now, a retracted portion or a retracted shape disposed in the first pretransfer guide 11 so as to reduce an effect of the paper dust generated from the sheet P on the patch sensor 13 will be described. To be noted, in this disclosure, the paper dust is not necessarily limited to a part of paper (paper fiber, filler, and the like), and includes the dust adhered to the sheet P and a part of the image already printed or written on the sheet. FIG. 6 indicates a state viewing the intermediate transfer unit 8 and the first pretransfer guide 11 from a side of the sheet conveyance path 14 (right side in FIG. 4). In FIG. 6, positions of the upper surfaces 39, which are the surfaces of the patch sensors 13 and face the intermediate transfer belt 26, are indicated by hatching patterns. To be noted, from a viewpoint of FIG. 6, the patch sensors 13 are hidden behind the upstream guide 11A.

As shown in FIG. 6, notch portions 18 which are in a recessed shape in which a part (i.e., first part) in the X direction (sheet width direction) of a downstream end 19 in the sheet conveyance direction is retracted toward the upstream side of the sheet conveyance direction are disposed in the first pretransfer guide 11. Regions (first region) in which the notch portions 18 are disposed in the X direction overlap at least the detection positions X2 and X2' of the patch sensors 13. The regions (first region) in which the notch portions 18 are disposed include detection regions of the patch sensors 13 in the X direction.

Figure 7:
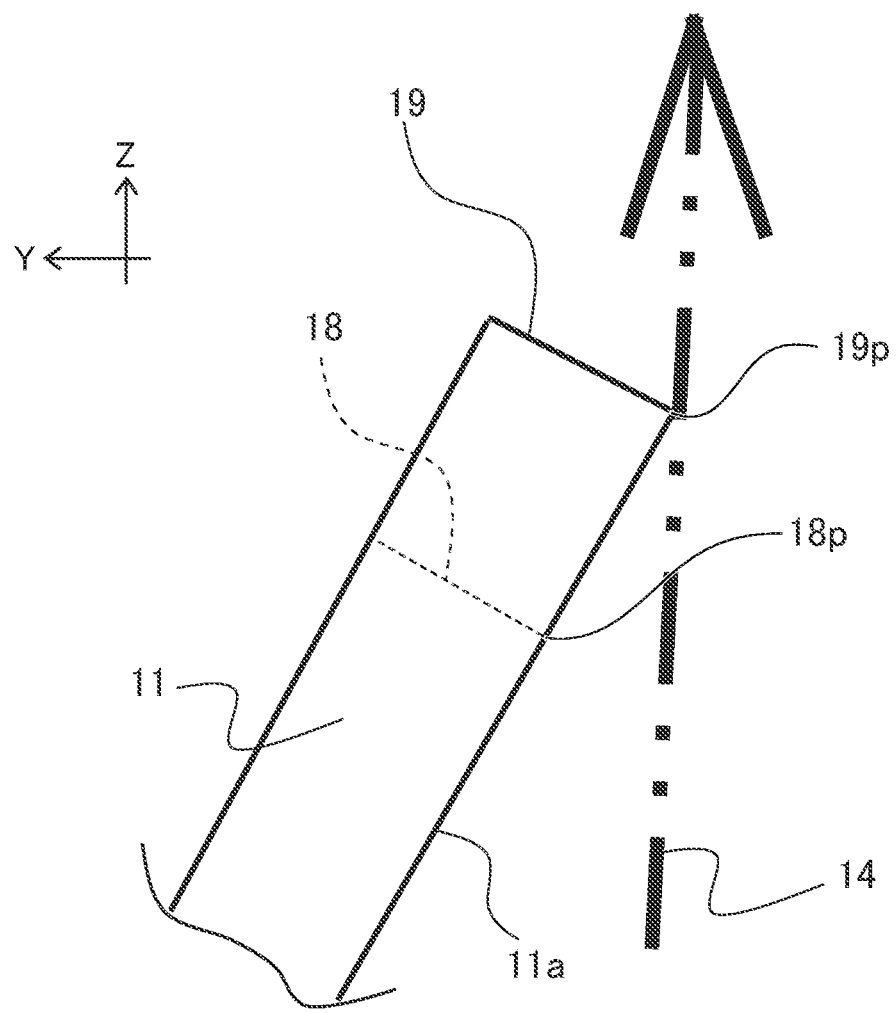
FIG. 7 is an enlarged view showing an edge portion of the first pretransfer guide according to the embodiment 1.

FIG. 7 is a schematic diagram viewing the vicinity of the downstream edge of the first pretransfer guide 11 in the X direction. As shown in FIG. 7, the first pretransfer guide 11 is disposed in such a manner that a guide surface 11a inclines at an angle of approximately 20 degrees with respect to the sheet conveyance path 14. Therefore, by disposing the notch portion 18, among edges 18p and 19p of the first pretransfer guide 11, in comparison with the edge 19p (i.e., second part) outside of the region in which the notch portion 18 is disposed, the edge 18p inside of the region in which the notch portion 18 is disposed is retracted to a side away from the sheet conveyance path 14. The edges 18p and 19p are edges of the guide surface 11a facing the sheet conveyance path 14 in the first pretransfer guide 11, and edges on the downstream side in the sheet conveyance direction. The side away from the sheet conveyance path 14 indicates a side away from the sheet conveyance path 14 with respect to the sheet conveyance direction (sheet conveyance direction in a position nearest to the downstream end of the first pretransfer guide 11 within the sheet conveyance path 14) and a direction perpendicular to the sheet width direction. As described above, within the guide of this embodiment, with respect to the sheet width direction perpendicular to the sheet conveyance direction, in comparison with a part not overlapping the detection position of the sensor, the retracted shape retracted to the side away from a passing position of the sheet in the conveyance path is disposed in a part overlapping the detection position of the sensor.

During the conveyance of the sheet P, the paper dust is mainly generated by the rubbing of the sheet P with the guides. In this embodiment, by disposing the notch portions 18, serving as the retracted shape as described above, the first pretransfer guide 11 comes less likely into contact with the sheet P in the region in which the notch portions 18 are disposed, so that the generation of the paper dust is reduced. In particular, the first pretransfer guide 11 which is the guide projecting to the opposite side of the conveyance path toward the downstream side in the sheet conveyance direction tends to easily generate the paper dust by strongly rubbing the sheet P at the downstream edge of the guide surface 11a. In this embodiment, by disposing the notch portions 18, it is possible to reduce the generation of the paper dust in the edges 18p which are in the regions overlapping the detection positions X2 and X2' of the patch sensors 13.

To be noted, even if a depth of the notch portion 18 (distance from the edge 18p of the notch portion 18 to the edge 19p outside of the notch portion 18) is, for example, as shallow as about 1 mm (preferably, about 1.5 mm), it is found that it is possible to effectively reduce the generation of the paper dust. Further, it is possible to make the depth of the notch portion 18 approximately constant over the whole of the notch portion 18 in the sheet conveyance direction. Further, as the retracted shape, instead of the notch portions 18 of this embodiment, it is also possible to dispose depressed surface portions in which a part of the guide surface 11a is retracted (or a retracted portion, refer to a drawn portion 23 of an embodiment 2). However, since the first pretransfer guide 11 faces the intermediate transfer belt 26 on the surface opposite to the conveyance path, in a case where the depressed surface portions are disposed, a necessary clearance is secured so as not to bring the first pretransfer guide 11 into contact with the intermediate transfer belt 26. In this embodiment, the retracted shape is not the depressed surface portion but the notch portion 18, in comparison with the alternative example described above, it is possible to dispose the first pretransfer guide 11 closer to the intermediate transfer belt 26 and guide the sheet P to a position nearer to the secondary transfer portion N2.

Using FIG. 6, a relationship between the notch portion 18 and a position of a side edge of the sheet will be further described. In FIG. 6, widths of the regular size sheets on which the image forming apparatus 1 is able to perform the image formation are indicated by two-dot chain lines. As regards the notch portion 18 on the one side (right side in FIG. 6) in the X direction, a distance from the central reference position X0 to an end 18a of the notch portion 18 on a side near to the central reference position X0 is referred to as La. As regards the notch portion 18 on the one side (right side in FIG. 6) in the X direction, a distance from the central reference position X0 to an end 18b of the notch portion 18 on a side far from the central reference position X0 is referred to as Lb. Similarly, as regards the notch portion 18 on the other side (left side in FIG. 6) in the X direction, a distance from the central reference position X0 to the end 18a of the notch portion 18 on the side near to the central reference position X0 is referred to as La'. As regards the notch portion 18 on the other side (left side in FIG. 6) in the X direction, a distance from the central reference position X0 to the end 18b of the notch portion 18 on the far side from the central reference position X0 is referred to as Lb'. To be noted, the ends 18a and 18b indicate positions of an opening portion (upper end positions in FIG. 6) in a notch shape.

In this embodiment, the notch portion 18 on the one side (right side in FIG. 6) in the X direction is disposed so as to satisfy the relationship of La<L1<L3<Lb. Similarly, the notch portion 18 on the other side (left side in FIG. 6) in the X direction is disposed so as to satisfy the relationship of La'<L1'<L3'<Lb'. In other words, the retracted shapes (retracted portion) of this embodiment are disposed over the first region (La to Lb, La' to Lb') in the sheet width direction perpendicular to the sheet conveyance direction, and, in comparison with part of the second region of the guide described above in the sheet width direction, are retracted so as not to come into contact with the sheet passing through the conveyance path described above. Incidentally, the first region described above includes the detection region of the sensor described above in the sheet width direction, and the second region is the sheet passing region excluding the first region described above. Further in other words, with respect to the sheet width direction, the regions (18a to 18b) in which the retracted shapes (retracted portion) are disposed include over the whole areas (X1 to X3, X1' to X3') of the surfaces (upper surface 39) on which the sensors face the measuring object in the sheet width direction. Thereby, it is possible to effectively reduce a possibility that the paper dust reaches the surfaces (objective surface) on which the sensors face the measuring object.

Further, in this embodiment, a plurality of sensors are disposed, and a plurality of retracted shapes are disposed corresponding to the plurality of sensors. Each of the plurality of retracted shapes is disposed over a region in the sheet width direction including the whole area of a surface on which a corresponding sensor faces the measuring object. With this configuration, it is possible to reduce the effect of paper dust on each of the patch sensors 13 more reliably. Further, in this embodiment, with respect to the Z direction (vertical direction), the notch portions 18 are disposed above the patch sensors 13. That is, since the retracted shapes reducing the generation of the paper dust are disposed in the guide in a configuration in which the guide becoming a generation portion of the paper dust is disposed above the sensor, it is possible to effectively reduce the arrival of the paper dust at the sensor.

Further, among the regular sizes, the image forming apparatus 1 of this embodiment is capable of performing the image formation with respect to the sheet P of at least A5 size (sheet width 149 mm), B5 size (sheet width 182 mm), A4 size (sheet width 210 mm), and letter (LTR) size (sheet width 216 mm). As shown in FIG. 6, the ends 18a on inner sides of the respective notch portions 18 in the X direction (sheet width direction) are positioned outside of side edges of the A5 size and inside of side edges of the B5 size. Further, the ends 18b on outer sides of the respective notch portions 18 in the X direction (sheet width direction) are positioned outside of side edges of the B5 size and inside of side edges of the A4 and LTR sizes.

With the positional relationship described above, the side edges of the sheet P of the A5, A4, and LTR sizes are guided by portions in which the notch portions 18 of the first pretransfer guide 11 are not disposed. That is, since the side edges of the sheet P of these sizes are guided by the edges 19p (refer to FIG. 7) in the region in which the notch portions 18 are not disposed, the side edges of the sheet P are prevented from accidentally coming into contact with the intermediate transfer belt 26 on the upstream side of the secondary transfer portion N2. Further, during the conveyance of the sheet P of these sizes, normally, the sheet P does not rub the edges 18p of the notch portions 18, and it is less likely that the paper dust is generated by the rubbing of the edges 18p on the sheet P.

On the other hand, as regards the sheet P of the B5 size, the side edges are positioned inside of the notch portions 18 with respect to the X direction (sheet width direction). However, since the ends 18a on the inner sides of the notch portions 18 are positioned at least outside of the positions of the side edges of the A5 size, a distance from the end 18a on the inner side of the notch portion 18 to the side edge of the sheet P of the B5 size is usually a short distance of equal to or less than 17 mm. Therefore, even during the conveyance of the sheet P of the B5 size, the side edges of the sheet P are less likely to come into contact with the edges 18p of the notch portions 18, and the generation of the paper dust due to the rubbing of the edges 18p on the sheet P is reduced.

Supposing a case where the notch portions 18 are not disposed and the edge 19p of the first pretransfer guide 11 continuously extends in a straight line over the whole area in the X direction, the paper dust is generated in portions adjacent to the detection positions X2 and X2' of the patch sensors 13 by the rubbing of the edge 19p with the sheet P. Part of this paper dust reaches the upper surfaces 39 of the patch sensors 13 by floating in a space inside of the image forming apparatus 1. Then, when an amount of the paper dust adhered to the upper surfaces 39 of the patch sensors 13 is increased, the detection performance of the patch sensors 13 is degraded. In particular, since the light for detection is irregularly reflected by the paper dust, a change in a light receiving amount corresponding to the image density is obstructed, so that it is possible that the degradation of detection sensitivity and erroneous detection occur.

On the other hand, in this embodiment, since the notch portions 18, serving as the retracted shape, are disposed in the positions overlapping the detection positions X2 and X2' of the patch sensors 13, the generation of the paper dust in portions adjacent to the detection positions X2 and X2' is reduced. The shorter the distance from a generation position of the paper dust to the patch sensor 13 is, the higher a probability that the generated paper dust reaches the patch sensor 13 becomes. Therefore, by reducing the generation of the paper dust in the portions adjacent to the detection positions X2 and X2', the amount of the paper dust which reaches the patch sensor 13 is reduced, and the degradation of the detection performance of the sensor by the paper dust becomes less likely to occur.

In particular, the patch sensor 13 of this embodiment is positioned on the opposite side of the sheet conveyance path 14 across the first pretransfer guide 11, and in a positional relationship of being adjacent to an opposite surface of the conveyance path of the first pretransfer guide 11. As described above, even if the first pretransfer guide 11 and the patch sensor 13 are adjacent to each other in a case viewed in the X direction, by reducing the generation of the paper dust in the portions adjacent to the detection positions X2 and X2' of the patch sensors 13, it is possible to reduce the degradation of the detection performance of the sensor by the paper dust.

A positional relationship between the roller pair (registration roller pair 5) conveying the sheet P toward the guide (first pretransfer guide 11) and the retracted portion (notch portion) of the guide will be described. The roller pair includes a nip portion at which first and second rollers included in the roller pair come into contact with each other, and conveys the sheet by rotating while nipping the sheet at the nip portion. The nip portion is not necessarily formed over the whole of the sheet passing region in the sheet width direction. On the other hand, there is a possibility that the paper dust generated by the contact of the sheet with the rollers at the nip portion enters into the back side of the guide via the retracted portions (notch portions) of the guide. Therefore, it is possible to configure such that at least part of the regions (first region) in which the retracted portions of the guide are disposed with respect to the sheet width direction does not overlap with a region of the nip portion at which the pair of the rollers come into contact with each other. For example, it is possible to make the whole of the first region outside of the nip portion of the roller pair in the sheet width direction.

As described above, in this embodiment, within the guide, the retracted shapes retracted to positions receded from the passing position of the sheet in the conveyance path in comparison with a portion not overlapping the detection positions of the sensors are disposed in portions overlapping the detection positions of the sensors with respect to the sheet width direction. With this configuration, the guide and the sheet are less likely to come into contact with each other in portions adjacent to the detection positions of the sensors, so that it is possible to reduce a possibility that the paper dust generated by the rubbing of the guide with the sheet reaches the sensor. Thereby, it is possible to reduce the effect of paper dust on the detection performance of the sensor, and the sensor is able to show a stable detection performance over a long period.

Alternative Example

Figure 8:
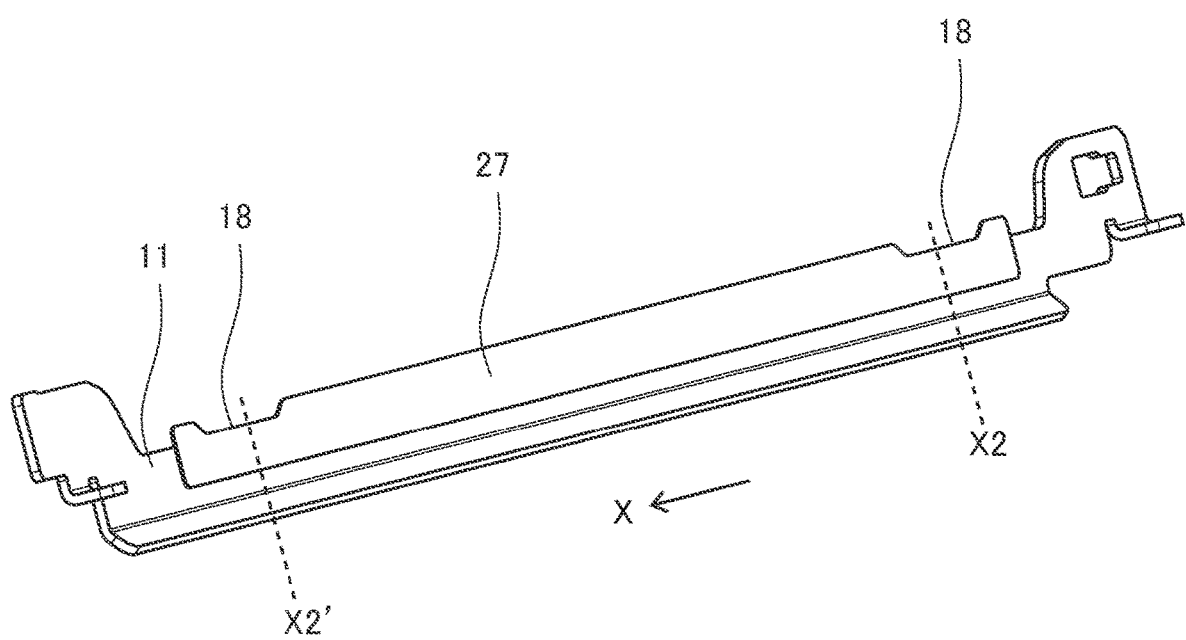
FIG. 8 is a perspective view showing a first pretransfer guide according to an alternative example of the embodiment 1.

Hereinafter, an alternative embodiment of this embodiment will be described using FIG. 8. FIG. 8 is a perspective view showing a first pretransfer guide 11 according to the alternative embodiment. While, in the embodiment 1, the first pretransfer guide 11 is constructed by plate shaped metal, in this alternative embodiment, the first pretransfer guide 11 is constructed by sticking a sheet material 27 made of resin onto a plate shaped guide body 11B. A tip of the sheet material 27 is the downstream end of the first pretransfer guide 11 in the sheet conveyance direction. In this configuration, the notch portions 18 in which a downstream end (edge of a guide surface) of the sheet material 27 recedes to the upstream side in the sheet conveyance direction are disposed in the positions overlapping the detection positions X2 and X2' of the patch sensors 13 in the X direction. Even with this configuration, since the generation of the paper dust in the portions adjacent to the detection positions X2 and X2' is reduced and an amount of the paper dust reaching the patch sensors 13 is reduced, it is possible to reduce the degradation of the detection performance of the sensor by the paper dust.

Embodiment 2

Next, using FIGS. 9 to 11, a second embodiment (embodiment 2) will be described. Hereinafter, elements on which reference characters common to the embodiment 1 are put have substantially equivalent configurations and functions described in the embodiment 1, and portions different from the embodiment 1 will be mainly described.

Figure 9:
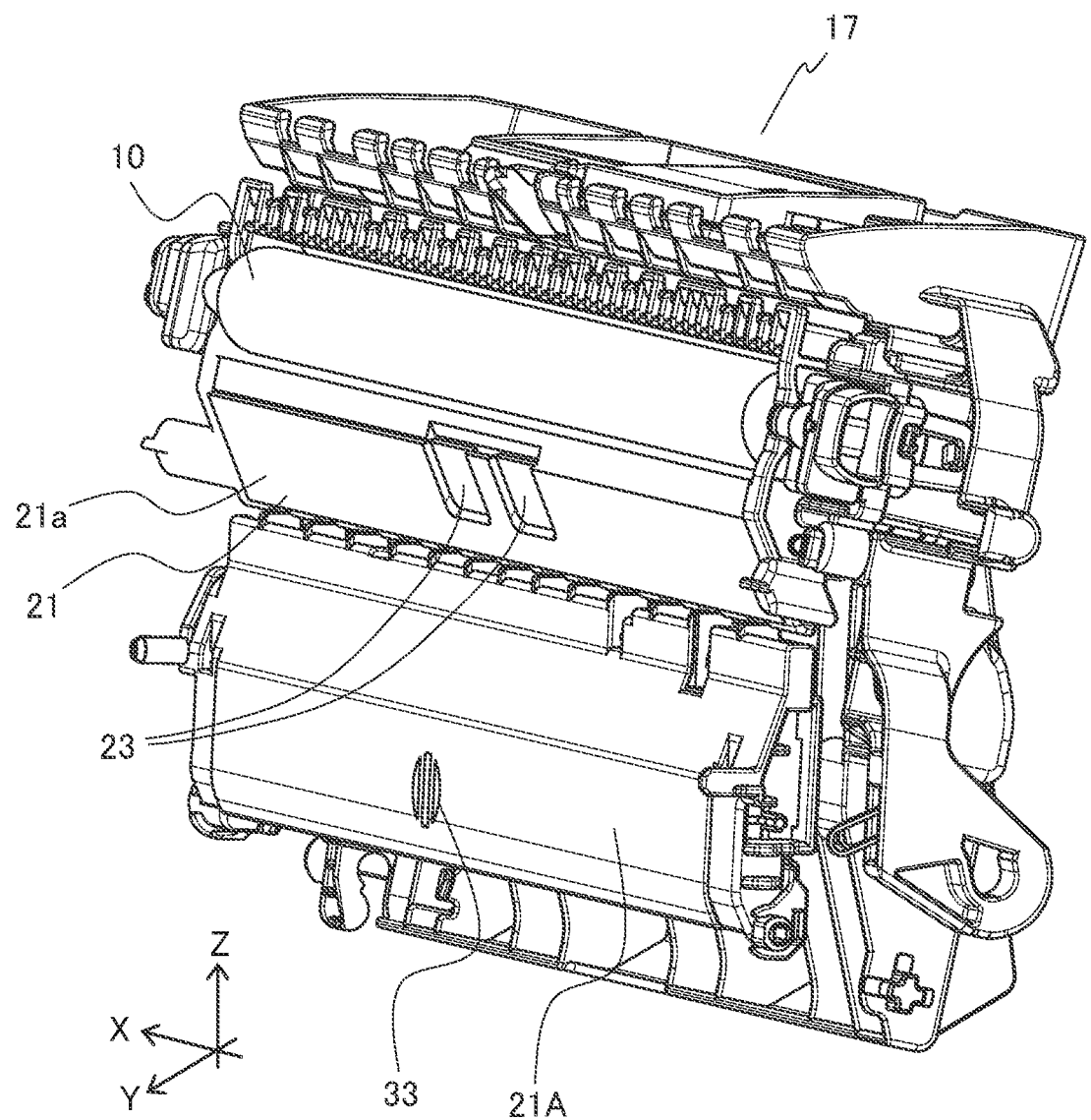
FIG. 9 is a perspective view showing a secondary transfer unit according to an embodiment 2.

FIG. 9 is a perspective view showing the secondary transfer unit 17 of this embodiment. The secondary transfer unit 17 includes a sheet material discrimination sensor 33, serving as a sensor according to this embodiment. The sheet material discrimination sensor 33 is a sensor for discriminating a sheet material using an ultrasonic wave. The sheet material discrimination sensor 33 includes a transmission portion disposed on a side of the secondary transfer unit 17 and transmitting the ultrasonic wave, and a receiving portion (not shown) disposed on the opposite side across the conveyance path and outputting a signal corresponding to the intensity of a received ultrasonic wave. Using the fact that the transmittance of the ultrasonic wave varies depending on a property (such as grammage) of the sheet P, the controller 50 of the image forming apparatus 1 is able to automatically discriminate a type of the sheet P based on the signal output by the receiving portion of the sheet material discrimination sensor 33. The controller 50 performs the control of the image forming operation (for example, the electrical current control in the secondary transfer portion N2 and the temperature control in the fixing device 9) in accordance with the material of the sheet P based on this discrimination result.

Figure 10:
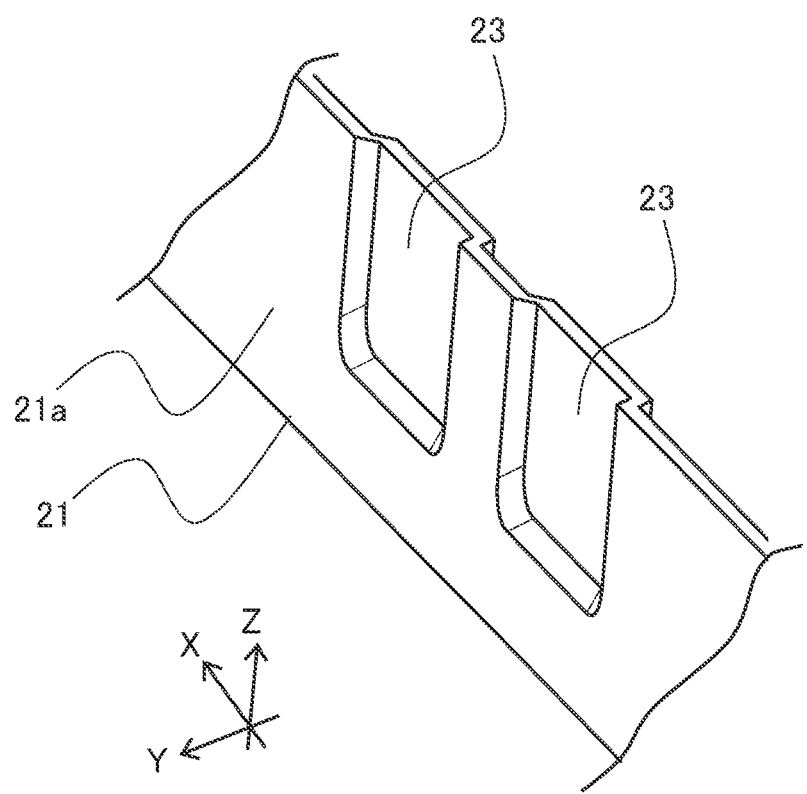
FIG. 10 is a perspective view showing part of a second pretransfer guide according to the embodiment 2.

FIG. 10 is a perspective view in which a center portion of the second pretransfer guide 21 of this embodiment in the X direction (sheet width direction) is enlarged. As shown in FIGS. 9 and 10, a drawn portions 23, serving as the retracted shape in which part of a guide surface 21a facing the conveyance path is retracted to a side receded from the sheet conveyance path 14, are disposed in the second pretransfer guide 21. The second pretransfer guide 21 of this embodiment is constructed by plate shaped metal, and the drawn portions 23 are formed as depressed surface portions retracted from the adjacent guide surface 21a by drawing or stamping. That is, the retracted shapes of this embodiment are the depressed surface portions in which part of a surface, among surfaces of the guide, facing the conveyance path is receded to a side retracted from the sheet passing through the conveyance path with respect to a direction perpendicular to the surface.

By disposing the drawn portions 23, serving as the retracted shape, the generation of the paper dust by the rubbing of the second pretransfer guide 21 with the sheet P is reduced in a position overlapping the detection position of the sheet material discrimination sensor 33 in the X direction. If the paper dust adheres to the transmission portion or the receiving portion of the sheet material discrimination sensor 33, there is a possibility that the transmission of the ultrasonic wave is obstructed and the accuracy of discriminating the sheet material is degraded. By this embodiment, the generation of the paper dust in the position overlapping the detection position of the sheet material discrimination sensor 33 in the X direction is reduced, so that the adherence of the paper dust to the sheet material discrimination sensor 33 is reduced. Thereby, it is possible to reduce the degradation of the detection performance (discrimination accuracy) of the sheet material discrimination sensor 33 by the paper dust.

By the way, while the notch shape of notching the edge of the guide is disposed as the retracted shape in the embodiment 1, since the depressed surface portion of retracting part of the guide is disposed in this embodiment, there is an advantage of securing the strength of the guide easily. Further, similar to the embodiment 1, the drawn portions 23, serving as the retracted portion, are positioned above the sheet material discrimination sensor 33 with respect to the gravity direction (Z direction). Since part of the paper dust generated by the rubbing of the second pretransfer guide 21 with the sheet P is considered to fall by following the gravity, if an amount of the paper dust generated above the sheet material discrimination sensor 33 is small, it is possible to reduce an amount of the paper dust reaching the sheet material discrimination sensor 33. As described above, even in a case where positions of a sensor and a guide having a tendency to generate the paper dust are apart from each other, in a case where there is a positional relationship of causing the paper dust to easily reach the sensor by the effect of the gravity, the air flow inside of the apparatus, or the like, the retracted shape for reducing the generation of the paper dust is suitably disposed to such a guide.

FIG. 11 is a diagram showing the secondary transfer unit 17 of this embodiment when viewed from the side of the sheet conveyance path. The sheet material discrimination sensor 33 is disposed only on one side in the X direction with respect to the central reference position X0. That is, the sensor of this embodiment is asymmetrically disposed in the sheet width direction with respect to the central reference position X0. On the other hand, the drawn portions 23 are symmetrically disposed on both sides of the central reference position X0 with respect to the central reference position X0, and one side of the drawn portions 23 is disposed so as to include the detection position of the sheet material discrimination sensor 33. That is, with respect to the sheet width direction, the retracted shapes of this embodiment include the detection position of the sensor, and are symmetrically disposed with respect to the central reference position X0.

Hereinafter, within a surface (opening region disposed on the guide for emitting the ultrasonic wave) on which the sheet material discrimination sensor 33 faces the conveyance path, an end position on the side near to the central reference position X0 is referred to as X4, and an end position on the side far from the central reference position X0 is referred to as X6. The detection position X5 of the sheet material discrimination sensor 33 is an intermediate position between the end positions X4 and X6. Further, distances from the central reference position X0 to the respective positions (X4, X5, and X6) of the sheet material discrimination sensor 33 are respectively referred to as L4 (mm), L5 (mm), and L6 (mm).

As regards the one side (left side in FIG. 11) of the drawn portions 23, a distance from the central reference position X0 to an end 23a of the drawn portion 23 on the side near to the central reference position X0 is referred to as Lc. As regards the one side (left side in FIG. 11) of the drawn portions 23, a distance from the central reference position X0 to an end 23a of the drawn portion 23 on the side far from the central reference position X0 is referred to as Ld. Similarly, as regards the other side (right side in FIG. 11) of the drawn portions 23, a distance from the central reference position X0 to the end 23a of the drawn portion 23 on the side near to the central reference position X0 is referred to as Lc'. As regards the other side (right side in FIG. 11) of the drawn portions 23, a distance from the central reference position X0 to the end 23a of the drawn portion 23 on the side far from the central reference position X0 is referred to as Ld'.

The drawn portion 23 on the same side as the sheet material discrimination sensor 33 is disposed so as to satisfy a relation of Lc<L4<L5<Ld. In other words, regions in which the retracted shapes are disposed in the sheet width direction include the whole area of the surface on which the sensor faces the measuring object in the sheet width direction. Thereby, it is possible to effectively reduce the effect of the paper dust on the sheet material discrimination sensor 33.

In particular, in this embodiment, the sensor is asymmetrically disposed with respect to the central reference position X0 in the sheet width direction, and, with respect to the sheet width direction, the retracted shapes include the detection position of the sensor, and are symmetrically disposed with respect to the central reference position X0. With this configuration, while reducing the effect of the paper dust on the sheet material discrimination sensor 33, it is possible to reduce a possibility of the occurrence of the skew of the sheet P in comparison with a case where the drawn portions 23 are asymmetrically disposed. That is, in the case where the drawn portions 23 are disposed asymmetrically, since the friction resistance which the sheet P receives from the second pretransfer guide 21 is distributed asymmetrically with respect to the X direction, there is a possibility that the sheet P circles during the conveyance. On the other hand, in this embodiment, by adding the drawn portion 23 (right side of the drawn portion 23 in FIG. 11) not essentially necessary in view of reducing the effect of the paper dust on the sheet material discrimination sensor 33 so as to dispose the drawn portions 23 symmetrically, it is possible to reduce a possibility that the sheet P circles. To be noted, in a case where the sheet material discrimination sensor 33 or other sensors are disposed asymmetrically in the sheet width direction, and in a case where a number or positions of sensors are different, the drawn portions 23 are disposed symmetrically while including such the number and the positions.

Alternative Example

While, in the embodiment 2, the sheet material discrimination sensor 33 using the ultrasonic wave is illustrated, it is acceptable to use a sheet material discrimination sensor which discriminates the sheet material by emitting the light to the sheet and detecting the intensity of reflected light and/or transmitted light. Even in such a case, since, if the paper dust adheres to the sensor, the degradation of the detection performance is led, it is possible to reduce the effect of the paper dust on the sensor by the configuration described in this embodiment.

Other Embodiments

Not limited to the patch sensor 13 and the sheet material discrimination sensor 33 of the embodiments 1 and 2 described above, the disposition of the retracted shape in the guide is effective so as to reduce the effect of the paper dust on a sheet conveyance apparatus handling the sheet. As an example, the image forming apparatus 1 indicated in FIG. 1 includes a color sensor 62 disposed in the duplex conveyance path 52. The color sensor 62 is an example of the optical sensor detecting the toner image formed on the sheet by the image forming unit. The controller 50 of the image forming apparatus 1 is able to adjust a color and the intensity at the image formation by, using the color sensor 62, detecting the color and the density of the image formed on the sheet P by the image forming unit 1B. In this case, it is possible to reduce the adherence of the paper dust to the color sensor 62 by disposing the retracted shape such as the notch portion 18 and the drawn portion 23 illustrated in the embodiments 1 and 2 in the guide included in the duplex conveyance path 52 disposed adjacent to the color sensor 62. Other examples of the sensors include an optical sensor for detecting the sheet on the sheet conveyance path so as to monitor a state of the sheet conveyance (presence/absence of a jam), and an optical sensor for detecting a deflection amount (loop amount) at the correction of the skew of the sheet or a deflection amount (loop amount) between the transfer and the fixing.

Further, while, in the embodiments 1 and 2 described above, the electrophotographic image forming apparatus including the intermediate transfer type image forming unit 1B is illustrated as the example, it is acceptable to apply the present technology to an electrophotographic image forming apparatus of a direct transfer type directly transferring the image from the image bearing member (photosensitive member) onto the sheet. Further, it is also applicable to, for example, an image forming apparatus of an ink jet system or an offset printing system other than the embodiments system.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-090899, filed on May 31, 2021, which is hereby incorporated by reference herein in its entirety.

What is claimed is:

1. A sheet conveyance apparatus comprising:
a sheet conveyor configured to convey a sheet, the sheet conveyor including a pair of rollers configured to rotate while nipping the sheet at a nip portion;
a guide configured to form a conveyance path through which the sheet is conveyed by the sheet conveyor, the guide including a distal end having a first portion and a second portion, the second portion of the distal end of the guide being configured to contact the sheet passing through the conveyance path, and the first portion of the distal end of the guide and the second portion of the distal end of the guide both being a part of a downstream-most edge of the guide in a sheet conveyance direction; and
a sensor disposed on a same side as the guide with respect to the conveyance path, the sensor being further disposed upstream of the nip portion and facing a roller member disposed upstream of the nip portion,
wherein the first portion of the distal end of the guide includes a retracted portion disposed corresponding to a first region in a sheet width direction perpendicular to the sheet conveyance direction, the retracted portion being retracted with respect to the second portion of the distal end of the guide such that the second portion of the distal end of the guide contacts the sheet passing through the conveyance path while the retracted portion, included in the first portion of the distal end of the guide, does not come into contact with the sheet passing through the conveyance path, the first region including a detection region of the sensor in the sheet width direction.

2. The sheet conveyance apparatus according to claim 1, wherein the retracted portion includes a recessed shape in which a first part of a downstream end of the guide in the sheet conveyance direction is recessed toward an upstream side in the sheet conveyance direction with respect to a second part of the downstream end, the first part corresponding to the first region.

3. The sheet conveyance apparatus according to claim 2, further comprising an opposite guide disposed on an opposite side to the guide across the conveyance path so that the conveyance path is formed between the guide and the opposite guide,
wherein, when viewed in the sheet width direction, the guide is projected to the conveyance path such that a more downstream part thereof in the sheet conveyance direction is closer to the opposite guide.

4. The sheet conveyance apparatus according to claim 2, wherein at least part of the first region does not overlap with a region of the nip portion in the sheet width direction, the nip portion being a portion at which the pair of rollers come into contact with each other.

5. The sheet conveyance apparatus according to claim 1, wherein the retracted portion includes a depressed surface portion in which a part of a surface of the guide facing the conveyance path is depressed.

6. The sheet conveyance apparatus according to claim 1, wherein the sensor is one of a plurality of sensors, and
wherein the retracted portion is one of a plurality of retracted portions disposed correspondingly to the plurality of sensors.

7. The sheet conveyance apparatus according to claim 1, wherein the sensor is disposed asymmetrically with respect to a central reference position of the sheet in the sheet width direction, and
wherein the retracted portion is one of a plurality of retracted portions disposed symmetrically with respect to the central reference position in the sheet width direction.

8. The sheet conveyance apparatus according to claim 1, wherein the first region includes a whole region, in the sheet width direction, of a surface of the sensor facing a measuring object of the sensor.

9. The sheet conveyance apparatus according to claim 1, wherein the retracted portion is disposed above the sensor.

10. The sheet conveyance apparatus according to claim 1, wherein the sensor is configured to discriminate material of the sheet by using ultrasonic wave.

11. An image forming apparatus comprising:
the sheet conveyance apparatus according to claim 1; and
an image forming unit configured to form an image on the sheet conveyed by the sheet conveyance apparatus.

12. The image forming apparatus according to claim 11, wherein the image forming unit includes (i) a toner image forming unit including an image bearing member and configured to form a toner image on the image bearing member, (ii) an intermediate transfer member configured to convey the toner image primarily transferred from the image bearing member, and (iii) a transfer member configured to form a secondary transfer portion with the intermediate transfer member and transfer the toner image from the intermediate transfer member onto the sheet, and
wherein the sensor is an optical sensor configured to detect a pattern image formed on the intermediate transfer member by the toner image forming unit.

13. The image forming apparatus according to claim 12, wherein the pair of rollers is configured to convey the sheet to the secondary transfer portion,
wherein the guide is disposed between the pair of rollers and the secondary transfer portion in the sheet conveyance direction and configured to guide the sheet not to contact the intermediate transfer member, and
wherein the guide is formed from a metal plate.

14. The image forming apparatus according to claim 12, wherein, when viewed in the sheet width direction, the optical sensor is disposed adjacent to an opposite surface of the guide opposite to a surface of the guide facing the conveyance path.

15. The image forming apparatus according to claim 12, wherein the intermediate transfer member is an endless shaped belt member,
wherein the roller member is configured to support an inner circumferential surface of the belt member, and
wherein each of the guide and the optical sensor is disposed at a position facing the roller member across the belt member.

16. The image forming apparatus according to claim 11, wherein the sensor is an optical sensor configured to detect a toner image formed on the sheet by the image forming unit.

17. An image forming apparatus comprising:

a toner image forming unit including an image bearing member and configured to form a toner image on the image bearing member;

an intermediate transfer member configured to convey the toner image transferred from the image bearing member;

a transfer member configured to form a secondary transfer portion with the intermediate transfer member and transfer the toner image from the intermediate transfer member onto a sheet;

a sheet conveyor configured to convey the sheet, the sheet conveyor including a pair of rollers configured to rotate while nipping the sheet at a nip portion;

a first guide disposed on a same side as the intermediate transfer member with respect to a conveyance path of the sheet and configured to guide the sheet to the secondary transfer portion, the first guide including a distal end having a first portion and a second portion, the second portion of the distal end of the first guide being configured to contact the sheet passing through the conveyance path, and the first portion of the distal end of the first guide and the second portion of the distal end of the first guide both being a part of a downstream-most edge of the first guide in a sheet conveyance direction;

a second guide disposed on an opposite side of the intermediate transfer member with respect to the conveyance path and configured to face the first guide; and an optical sensor disposed downstream of a primary transfer portion and upstream of the secondary transfer portion in a conveyance direction of the intermediate transfer member and configured to detect a pattern image formed on the intermediate transfer member by the toner image forming unit, the primary transfer portion being a portion at which the toner image is transferred from the image bearing member to the intermediate transfer member, the optical sensor being further disposed upstream of the nip portion and facing a roller member disposed upstream of the nip portion, wherein, when viewed in a sheet width direction perpendicular to the sheet conveyance direction, the first guide is projected to the conveyance path such that a more downstream part thereof in the sheet conveyance direction is closer to the second guide, and wherein the first portion of the distal end of the first guide includes a retracted portion disposed corresponding to a first region in the sheet width direction, the retracted portion being retracted with respect to the second portion of the distal end of the first guide such that the second portion of the distal end of the first guide contacts the sheet passing through the conveyance path while the retracted portion, included in the first portion of the distal end of the first guide, does not come into contact with the sheet passing through the conveyance path, the first region including a detection region of the optical sensor in the sheet width direction.

18. The image forming apparatus according to claim 17, wherein the optical sensor is one of a plurality of optical sensors, and wherein the retracted portion is one of a plurality of retracted portions disposed correspondingly to the plurality of optical sensors.

19. The image forming apparatus according to claim 17, wherein the retracted portion of the first guide is disposed above the optical sensor.

20. The image forming apparatus according to claim 17, wherein the pair of rollers is configured to convey the sheet to the secondary transfer portion, wherein the first guide is disposed between the pair of rollers and the secondary transfer portion in the sheet conveyance direction and configured to guide the sheet not to contact the intermediate transfer member, and wherein the first guide is formed from a metal plate.

21. The image forming apparatus according to claim 17, wherein the intermediate transfer member is a belt member, wherein the roller member is configured to support an inner circumferential surface of the belt member, and wherein each of the first guide and the optical sensor is disposed at a position facing the roller member across the belt member.

* * * * *